(12) United States Patent
Liu et al.

(10) Patent No.: US 11,669,216 B2
(45) Date of Patent: Jun. 6, 2023

(54) DISPLAY DEVICE AND INTERFACE SWITCHING METHOD

(71) Applicant: Hisense Visual Technology Co., Ltd., Qingdao (CN)

(72) Inventors: Chenglong Liu, Qingdao (CN); Yanmei Yuan, Qingdao (CN); Donghang Li, Qingdao (CN); Guanghai Zhuang, Qingdao (CN)

(73) Assignee: HISENSE VISUAL TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 17/350,897

(22) Filed: Jun. 17, 2021

(65) Prior Publication Data
US 2021/0311592 A1    Oct. 7, 2021

Related U.S. Application Data

(63) Continuation of application No. PCT/CN2020/082281, filed on Mar. 31, 2020.

(30) Foreign Application Priority Data

Mar. 13, 2020   (CN) .......................... 202010177817.1

(51) Int. Cl.
*G06F 3/048*     (2013.01)
*G06F 3/0481*    (2022.01)
(Continued)

(52) U.S. Cl.
CPC .......... *G06F 3/0481* (2013.01); *G06F 1/1622* (2013.01); *G06F 3/0346* (2013.01); *G06F 9/451* (2018.02); *G06F 2200/1614* (2013.01)

(58) Field of Classification Search
CPC ...... G06F 3/0481; G06F 9/451; G06F 1/1622; G06F 3/0346; G06F 2200/1614
See application file for complete search history.

(56) References Cited

U.S. PATENT DOCUMENTS

2008/0105070 A1   5/2008  Sawai et al.
2010/0277467 A1*  11/2010 Kurihara .................. G09G 3/20
                                                   345/418
(Continued)

FOREIGN PATENT DOCUMENTS

CN        101102358 A     1/2008
CN        101236722 A     8/2008
(Continued)

OTHER PUBLICATIONS

CA Office Action from Chinese Application No. 202010177817.1 dated Jan. 4, 2022 (8 pages).
(Continued)

*Primary Examiner* — Mahelet Shiberou
(74) *Attorney, Agent, or Firm* — Workman Nydegger

(57) ABSTRACT

This disclosure can provide a display device, including a controller configured for determining whether an application interface of a current application supports a screen orientation after rotation; if so, outputting a rotation command so that a rotating component can drive the screen to rotate based on the rotation command; and if not, controlling the screen to display a prompt message, so that a user can determine whether to continue to control the screen to rotate via the prompt message if needed.

14 Claims, 11 Drawing Sheets

(51) Int. Cl.
G06F 9/451 (2018.01)
G06F 3/0346 (2013.01)
G06F 1/16 (2006.01)

(56) References Cited

U.S. PATENT DOCUMENTS

2012/0229370 A1    9/2012  Stroffolino et al.
2017/0061581 A1    3/2017  Hada
2017/0139576 A1*   5/2017  Jeong .................. G06F 3/04886
2017/0262053 A1    9/2017  Noh
2021/0249980 A1*   8/2021  Choi ....................... G01P 15/18

FOREIGN PATENT DOCUMENTS

| CN | 201142204 Y | 10/2008 |
| CN | 101887658 A | 11/2010 |
| CN | 103917940 A | 7/2014 |
| CN | 105260004 A | 1/2016 |
| CN | 105723322 A | 6/2016 |
| CN | 106371719 A | 2/2017 |
| CN | 106814989 A | 6/2017 |
| CN | 106933468 A | 7/2017 |
| CN | 110045753 A | 7/2019 |
| CN | 110399078 A | 11/2019 |
| CN | 110740364 A | 1/2020 |

OTHER PUBLICATIONS

Chinese Office Action, dated Jan. 19, 2023, from Chinese App. No. 202010301682.5.

* cited by examiner

DISPLAY DEVICE AND INTERFACE SWITCHING METHOD

CROSS-REFERENCE TO RELATED APPLICATIONS

The present application is a continuation of International Application No. PCT/CN2020/082281 filed Mar. 31, 2020, which claims the benefit and priority of Chinese Patent Application No. 202010177817.1 filed Mar. 13, 2020. The entire disclosures of the above applications are incorporated herein by reference.

FIELD

The present disclosure relates to the field of smart TVs, in particular to a display device and an interface switching method.

BACKGROUND

This section provides background information related to the present disclosure which is not necessarily prior art.

A smart TV device has an independent operating system and supports function expansion. Various applications, for example, social applications (including traditional video applications and short videos) and reading applications (including comics and reading books) can be installed in a smart TV according to the user needs. Images of these applications can be displayed on the screen of the smart TV, which provides rich media resources for the smart TV. Moreover, the smart TV can also interact with different terminals for data and resource sharing. For example, the smart TV can be connected to a mobile phone through wireless communication such as local area network and Bluetooth to play the resources in the mobile phone or directly cast the screen to display the images on the mobile phone.

However, due to different aspect ratio of different applications or different aspect ratio of media from different sources, the smart TV often displays a screen with the video ratio different from a traditional one. For example, video resources made via terminals such as mobile phones are generally vertical media with aspect ratios of 9:16, 9:18 and 3:4, while images provided by reading applications belong to vertical resource with an aspect ratio similar to that of books. The aspect ratio of the display screen of a smart TV is generally 16:9 or in other landscape states; as a result, when displaying vertical media such as short videos and comics through the smart TV, the vertical media screen cannot be displayed normally because of the mismatch of aspect ratio and display screen ratio. Generally, the vertical media screen needs to be scaled to a full display, which not only wastes the display space on the screen, but also leads to poor user experience.

SUMMARY

This section provides a general summary of the disclosure, and is not a comprehensive disclosure of its full scope or all of its features.

A first aspect of an embodiment of this disclosure provides a display device, including:
a screen;
a rotating component, connected to the screen and configured to drive the screen to rotate for a preset angle; and
a controller, configured to:

in response to a first command for rotating the screen from a user, determine whether an application interface of a current application supports a second screen orientation that is different from a first screen orientation, where the first screen orientation is a screen orientation before receiving the first command, and the second screen orientation is a screen orientation after rotation;

in response to determining that the application interface supports the second screen orientation, control the rotating component to rotate for an angle;

in response to determining that the application interface of the current application does not support the second screen orientation, control the screen to display a prompt message which indicates that the application interface does not support the second screen orientation.

A second aspect of an embodiment of this disclosure provides a display device, including:
a screen;
a rotating component, connected to the screen and configured to drive the screen to rotate for a preset angle; and
a controller, configured to:

in response to a first command for rotating the screen, determine whether an application interface of a current application supports a second screen orientation that is different from a first screen orientation, where the first screen orientation is a screen orientation before receiving the first command, and the second screen orientation is a screen orientation after rotation;

in response to determining that the application interface supports the second screen orientation, control the rotating component to rotate for an angle; and in response to determining that the application interface does not support the second screen orientation, control the screen to display the application interface in the first screen orientation.

A third aspect of an embodiment of this disclosure provides an interface switching method of a screen rotatable display device, including:

in response to a first command for rotating the screen from a user, determining whether an application interface of a current application supports a second screen orientation that is different from a first screen orientation, where the first screen orientation is a screen orientation before receiving the first command, and the second screen orientation is a screen orientation after rotation;

in response to determining that the application interface supports the second screen orientation, controlling a rotating component to rotate for an angle; and in response to determining that the application interface does not support the second screen orientation, controlling the screen to display a prompt message which indicates that the application interface does not support the second screen orientation.

A fourth aspect of an embodiment of this disclosure provides an interface switching method of a screen rotatable display device, including:

in response to a first command for rotating a screen from a user, determining whether an application interface of a current application supports a second screen orientation that is different from a first screen orientation, where the first screen orientation is a screen orientation before receiving the first command, and the second screen orientation is a screen orientation after rotation;

in response to determining that the application interface supports the second screen orientation, controlling a rotating component to rotate for an angle; and in response to determining that the application interface does not support the second screen, controlling the screen to display the application interface in the first screen orientation.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1A:
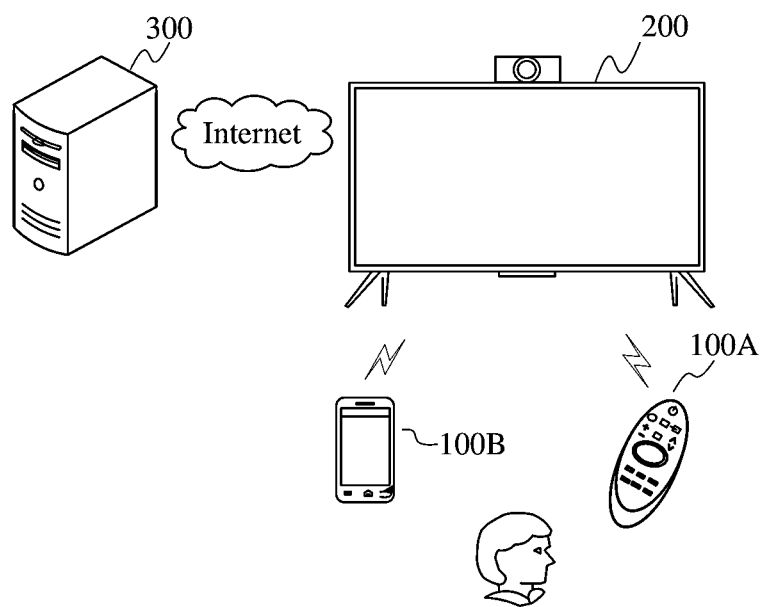
FIG. 1A is a diagram of an application scenario of a display device according to some embodiments of the present disclosure.

Example embodiments will now be described more fully with reference to the accompanying drawings.

The rotary TV, a new type of smart TV, mainly includes a screen and a rotating component. In particular, the screen is fixed to a wall or a bracket via the rotating component that can be used for adjusting the angle of the screen to rotate, and thus adapt to the screen with different aspect ratios. For example, in most cases, the screen is placed horizontally to display a video screen with an aspect ratio of 16:9 and 18:9. When the aspect ratio of video screen is 9:16, 9:18 and so forth, the horizontally placed screen needs to scale the screen with black areas presented on both sides of the screen. Therefore, the screen can be placed vertically by the rotating component to adapt to the video screens with an aspect ratio of 9:16, 9:18 and so forth.

For the purpose of facilitating the user to display the target media detail page in landscape and portrait states of the screen and improving the user view experience of the display device in different view states, the embodiments of the present disclosure provide a display device, a method for presenting detail pages and a computer storage medium, and the display device may be for example a rotary TV. It should be noted that the method provided in this embodiment is not only applied to the rotary TV but also applied to other display devices such as computers and tablet computers.

The term "module", as used in the embodiments of this disclosure, may refer to any known or later developed hardware, software, firmware, artificial intelligence, fuzzy logic, or combination of hardware or/and software codes, which is capable of performing the functions associated with the element.

The term "remote controller", as used in the embodiments of this disclosure, refers to a component of an electronic device (e.g. the display device disclosed in this disclosure), which can generally control the electronic device wirelessly over a short distance. The component may generally be connected to the electronic device through infrared and/or radio frequency (RF) signals and/or Bluetooth, and include functional modules such as WiFi, wireless USB, Bluetooth and motion sensors. For example, this component is a hand-held touch remote controller, which uses a user interface in a touch screen to replace most of the physical built-in hard keys in a general remote control device.

The term "gesture", as used in the embodiments of this disclosure, refers to a user action for expressing a desired idea, action, purpose and/or result through a change in hand shape or hand motion or other actions.

The term "hardware system", as used in the embodiments of this disclosure, may refer to a physical component composed of mechanical, optical, electrical, or magnetic device such as an integrated circuit (IC) and a printed circuit board (PCB), and having the computation, control, storage, input and output functions. In various embodiments of this disclosure, the hardware system is also commonly referred to as a motherboard or a main chip or a controller.

FIG. 1A shows an application scenario of a display device according to some embodiments of the present disclosure. As shown in FIG. 1, the communication between the control device (100A, 100B) and the display device 200 may be implemented in a wired or wireless manner.

Here, the control device is configured to control the display device 200, and can receive a command input from a user and convert the command into an instruction that the display device 200 can identify and respond to, acting as an intermediary for interaction between the user and the display device 200. For example, the user operates the channel up/down keys on the control device, and the display device 200 responds to the channel up/down operation.

The control device may be a remote controller 100A, adopts infrared protocol communication or Bluetooth protocol communication and other short range communication methods, and controls the display device 200 in a wireless or wired manner. The user may input user commands via keys on the remote controller, voice input or control panel input. For example, the user may input corresponding control commands through the volume up/down keys, channel control keys, up/down/left/right directional keys, voice input keys, menu keys and power key on the remote controller to control the functions of the display device 200.

The control device may also be a smart device such as a mobile terminal 100B, a tablet computer, a computer and a laptop computer. For example, an application running on the smart device is used for controlling the display device 200. The application may be configured to provide users with various controls through an intuitive user interface (UI) on the display associated with smart devices.

Exemplarily, both the mobile terminal 100B and the display device 200 may be installed with software applications, so that connection and communication between them can be realized through a network communication protocol, thereby achieving one-to-one control operation and data communication. For example, a control command protocol may be established between the mobile terminal 100B and the display device 200 to realize the functions of the physical keys on the remote control 100A by operating various function keys or virtual controls of the user interface provided on the mobile terminal 100B. The audio and video contents displayed on the mobile terminal 100B may also be transmitted to the display device 200 to achieve the synchronous display function.

The display device 200 can provide a network television functionality with a broadcast reception function and a computer support function, and may be implemented as, for example, a digital television, a network television, an Internet Protocol Television (IPTV), and the like.

The display device 200 may be a liquid crystal display, an organic light emitting display and a projection equipment. The specific type, size and resolution of the display device are not limited.

The display device 200 may further implement data communication with a server 300 through a variety of communication manners. Here, the display device 200 may connect to the server 300 through a local area network (LAN), a wireless local area network (WLAN), and other networks. The server 300 can provide a variety of contents to the display device 200 and interacts with the display device 200. Exemplarily, the display device 200 can send and receive information, such as receiving electronic program guide (EPG) data, receiving software updates, or accessing a digital media library stored remotely. The server 300 may be one group or multiple groups of servers, and may be one or more types of servers, and used for providing other network service contents such as video on demand and advertising service.

Figure 1B:
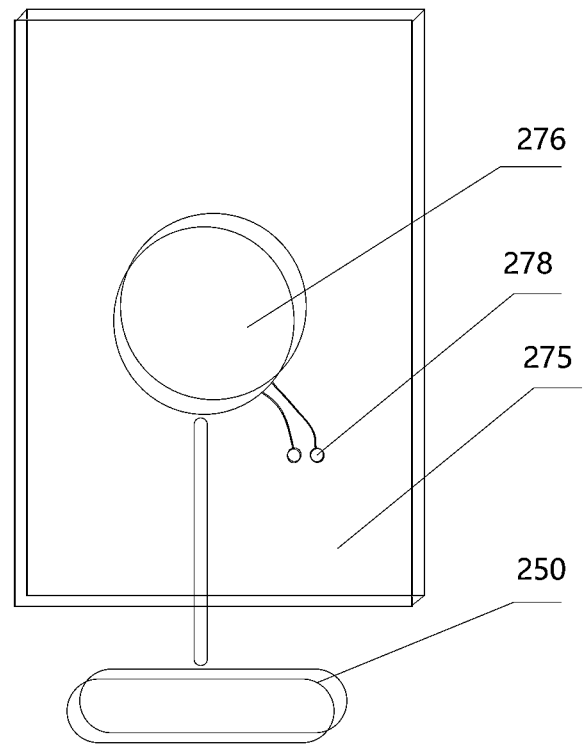
FIG. 1B is a rear view of a display device according to some embodiments of the present disclosure.

In some embodiments, as shown in FIG. 1B, the display device 200 includes a back plane, a controller 250, a screen 275, a terminal interface 278 extending from a gap on a backplane and a rotating component 276 connected to the back plane. The rotating component 276 can cause the screen to rotate, and can rotate the screen into a portrait state when viewed from the front of the display device, i.e. a state where the vertical side of the screen is longer than the horizontal side, or the rotating component 276 can also rotate the screen to a landscape state, i.e. a state where the horizontal side of the screen is longer than the vertical side.

Figure 2:
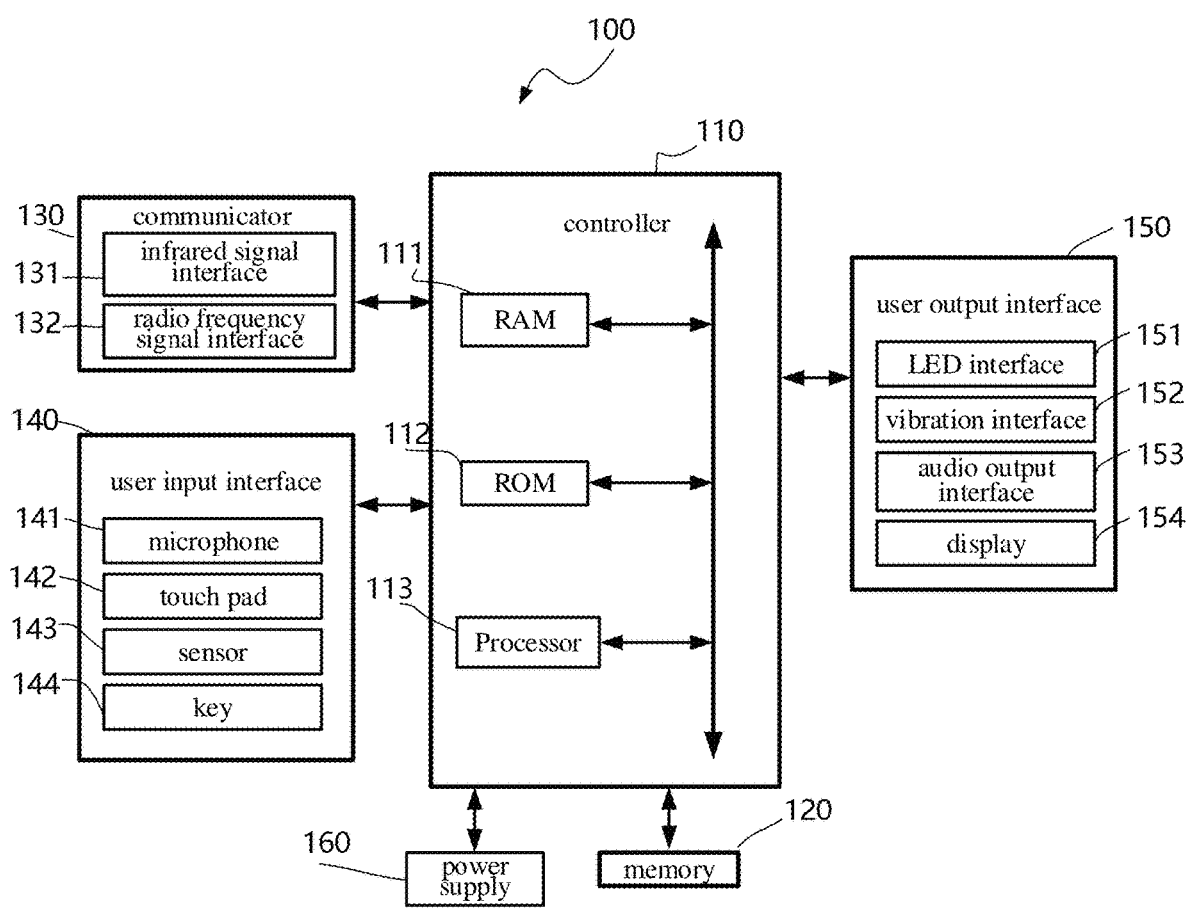
FIG. 2 is a block diagram of the hardware configuration of a control device in FIG. 1A according to some embodiments of the present disclosure.

FIG. 2 exemplarily illustrates a configuration block diagram of the control device. As shown in FIG. 2, the control device includes a controller 110, a memory 120, a communicator 130, a user input interface 140, a user output interface 150 and a power supply 160.

The controller 110 includes a random access memory (RAM) 111, a read-only memory (ROM) 112, a processor 113, a communication interface and a communication bus. The controller 110 is used for controlling the running and operation of the control device, the communication collaboration between internal components, and the external and internal data processing functions.

Exemplarily, when an interaction from a user, such as pressing a key on the remote controller 100A or touching a touch panel on the remote controller 100A is monitored, the controller 110 can control the generation of a signal corresponding to the monitored interaction and send the signal to the display device 200.

The memory 120 is used for storing various running programs, data, and applications for driving and controlling the control device under the control of the controller 110. The memory 120 can store various types of control signal commands input from a user.

The communicator 130 realizes the communication of control signals and data signals with the display device 200 under the control of the controller 110. For example, the control device sends control signals (e.g., touch signals or control signals) to the display device 200 via the communicator 130, and receives signals sent from the display device 200 via the communicator 130. The communicator 130 may include an infrared signal interface 131 and a radio frequency signal interface 132. For example, when an infrared signal interface is used, the user input command needs to be converted into infrared control signals in accordance with an infrared control protocol and the infrared control signals are sent to the display device 200 via an infrared sending module. For another example, when a radio frequency signal interface is used, the user input command needs to be converted into digital signals, and then the digital signals are modulated in accordance with a radio frequency control signal modulation protocol, and sent to the display device 200 via a radio frequency sending terminal.

The user input interface 140 may include at least one of a microphone 141, a touch pad 142, a sensor 143 and a key 144 so that a user can input a control associated command of the display device 200 to the control device by voice, touch, gesture, press, and the like.

The user output interface 150 outputs a user command received via the user input interface 140 to the display device 200, or outputs an image or voice signal received from the display device 200. Here, the user output interface 150 may include an LED interface 151, a vibration interface 152 for generating vibrations, an audio output interface 153 for outputting sounds, and a display 154 for outputting images. For example, the remote controller 100A can receive output signals such as audio, video, or data from the user output interface 150, and output the output signals as an image on the display 154, as audio on the audio output interface 153, or as vibration on the vibration interface 152.

The power supply 160 is used for providing power for various components of the control device under the control of the controller 110, and may be in the form of batteries and related control circuits.

Figure 3:
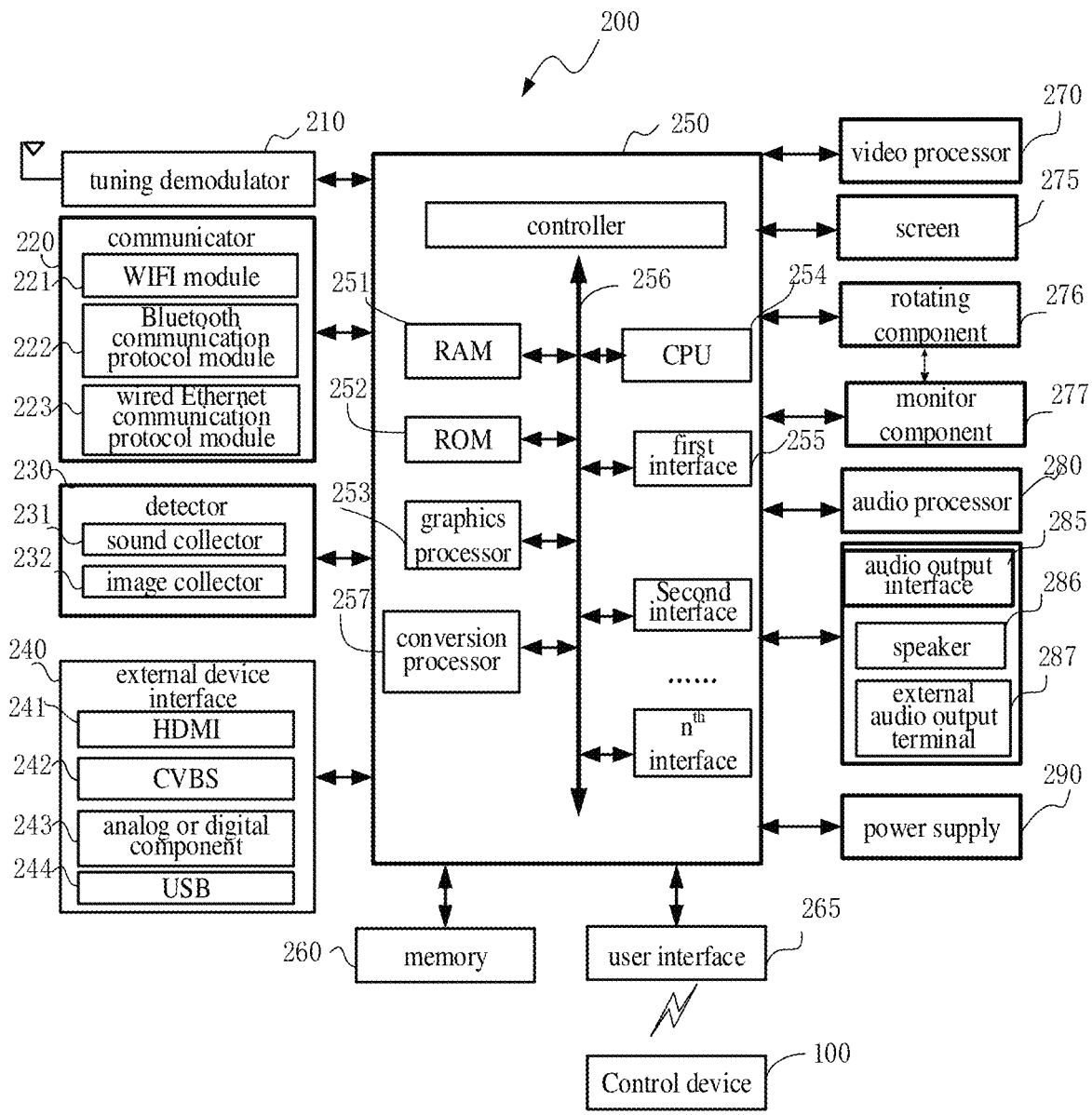
FIG. 3 is a block diagram of the hardware configuration of a display device 200 in FIG. 1A according to some embodiments of the present disclosure.

FIG. 3 exemplarily illustrates a configuration block diagram of the hardware of the display device 200. As shown in FIG. 3, the display device 200 may include a tuning demodulator 210, a communicator 220, a detector 230, an external device interface 240, a controller 250, a memory 260, a user interface 265, a video processor 270, a screen 275, a rotating component 276, a monitor component 277, an audio processor 280, an audio output interface 285 and a power supply 290.

Here, the monitor component 277 may be arranged independently or arranged within the controller.

Here, the rotating component 276 may include a drive motor, a rotating shaft and other components. The drive motor may be connected to the controller 250 and output a rotation angle under the control of the controller 250; one end of the rotating shaft is connected to a power output of the drive motor and the other end of the rotating shaft is connected to the screen 275 so that the screen 275 can be amounted on a wall or a bracket by the rotating component 276.

The rotating component 276 may also include other components such as a transmission component and a detection component. The transmission component can adjust the rotational speed and a moment output from the rotating component 276 at a specific transmission ratio, possibly in a form of gearing transmission. The detection component may comprise sensors on the rotating shaft, such as an angle sensor and a posture sensor. These sensors can detect parameters such as the rotation angle of the rotating component 276 and send the detected parameters to the controller 250 so that the controller 250 can determine or adjust the state of the display device 200 according to the detected parameters. In practice, the rotating component 276 may include, but is not limited to one or more of the above components.

The monitor component 277 is used for monitoring the rotation information of the rotating component 276 and outputting the rotation information to the controller.

The tuning demodulator 210 receives broadcast television signals in a wired or wireless manner, implements modulation and demodulation processing such as amplification, mixing, and resonance, and is used for demodulating audio and video signals carried in the frequency of the TV channel selected by the user and additional information (such as EPG data) from a plurality of wireless or wired broadcast TV signals.

The tuning demodulator 210, which according to the user's selection, and under the control of the controller 250, can respond to the frequency of the TV channel selected by the user and the TV signal carried by the frequency.

The tuning demodulator 210, depending on the broadcasting format of the television signal, can receive signals in a variety of ways such as terrestrial broadcasting, cable broadcasting, satellite broadcasting or Internet broadcasting; depending on the type of modulation, adopts a digital modulation manner or an analog modulation manner; and depending on the type of television signal, demodulates an analog signal and a digital signal.

In some other exemplary embodiments, the tuning demodulator 210 may also be arranged in an external device, for example, an external set-top box. In this way, the set-top box outputs a television signal after modulation and demodulation, and the television signal is input into the display device 200 via the external device interface 240.

The communicator 220 is a component for communicating with external devices or external servers according to various communication protocol types. For example, the display device 200 can send content data to an external device connected via the communicator 220, or, browse and download the content data from an external device connected via the communicator 220. The communicator 220 may include a network communication protocol module or a near-field communication protocol module such as a WIFI module 221, a Bluetooth communication protocol module 222 and a wired Ethernet communication protocol module 223 so that the communicator 220 can receive control signals from the control device under the control of the controller 250 and perform the control signals as WIFI signals, Bluetooth signals, radio frequency signals, and the like.

The detector 230 is a component of the display device 200 for collecting signals from the external environment or interacting with the outside. The detector 230 may include a sound collector 231 (e.g. a microphone) that can be used for receiving a user voice such as a voice signal of a control command for controlling the display device 200 or can acquire an ambient sound for identifying the type of environmental scene so that the display device 200 can automatically adapt to the environmental noise.

In some other exemplary embodiments, the detector 230 may also include an image collector 232 (e.g. a camera) for collecting external environmental scenes to adapt to the change of the display parameters of the display device 200 automatically, and for collecting user attributes or gestures that interact with the user to enable interaction between the display device and the user.

In some other exemplary embodiments, the detector 230 may also include a light receiver for collecting ambient light intensity to adapt to the change of the display parameters of the display device 200 automatically.

In some other exemplary embodiments, the detector 230 may also include a temperature sensor. For example, by sensing ambient temperature, the display device 200 can adaptively adjust the display color temperature of images. Exemplarily, the display device 200 can be adjusted to display the image color temperature in a cooler tone at a high environmental temperature or in a warmer tone at a low environmental temperature.

The external device interface 240 is a component that provides the controller 250 to control data transfer between the display device 200 and external devices. The external device interface 240 can be connected to external devices such as set-top boxes, gaming devices, laptops in a wired/wireless manner, and receive data such as video signals (e.g., motion images), audio signals (e.g., music) and additional information (e.g., EPG) from the external devices.

Here, the external device interface 240 may include any one or more of: a high-definition multimedia interface (HDMI) 241, a composite video blanking and synchronization (CVBS) interface 242, an analog or digital component interface 243, a universal serial bus (USB) interface 244, a component interface (not shown), a red, green and blue (RGB) interface (not shown), and the like.

The controller 250 controls the operation of the display device 200 and responds to the operation of the user by running various software control programs (e.g. an operating system and various applications) stored in the memory 260.

As shown in FIG. 3, the controller 250 includes a random access memory (RAM) 251, a read-only memory (ROM) 252, a graphics processor 253, a CPU 254, a communication interface 255, a communication bus 256, a conversion processor 257. The RAM 251, the ROM 252, the graphic processor 253, the CPU 254, the communication interface 255 and the conversion processor 257 are connected by the communication bus 256. The functions of the conversion processor 257 will be described in detail in the following embodiments.

The ROM 252 is used for storing various system start-up commands. For example, when receiving the power-on signal, the power supply of the display device 200 is started, and the CPU 254 runs the system startup command in the ROM 252 and copies the operating system stored in the memory 260 into the RAM 251 to start running the operating system. After the operating system is started, the CPU 254 copies the various applications in the memory 260 to the RAM 251 and then starts running the various applications.

The graphic processor 253 is used for generating various graphic objects such as icons, operation menus and displaying graphics according to the user input command. The graphic processor 253 may include an operator for performing operations on various interactive instructions received from a user, thereby displaying various objects based on display properties; and may include a renderer for generating various objects obtained by the operator, with the rendered results displayed on the screen 275.

The CPU 254 is used for executing operating system and application instructions stored in the memory 260 and for processing various applications, data, and contents based on the received user input instructions, so as to finally display and play various audio and video contents.

In some exemplary embodiments, the CPU 254 may include multiple processors that may include a main processor and multiple sub-processors, or may include a main processor and one sub-processor. The main processor is used for performing some initialization operations of the display device 200 in the display device preload mode and/or for displaying the screen in the normal mode, while the multiple or one sub-processor is used for performing an operation in a standby mode, and the like.

The communication interface 255 may include a first interface to an n$^{th}$ interface that can be network interfaces connected to an external device via a network.

The controller 250 can control the overall operation of the display device 200. For example: in response to receiving a user input command for selecting a GUI object displayed on the screen 275, the controller 250 can then execute an operation related to the object selected by the user input command.

Here, the object may be any one of selectable objects, such as a hyperlink or an icon. The operation related to the selected object is, for example, an operation to display and connect to a hyperlink page, a document and an image, etc., or an operation to execute a program corresponding to the object. The user input command for selecting the GUI object may be a command input via various input devices (e.g., mouse, keyboard and touchpad) connected to the display device 200 or a voice command corresponding to an utterance spoken by a user.

The memory 260 is used for storing various types of data, software programs or applications that drive and control the operation of the display device 200. The memory 260 may include volatile and/or non-volatile memory. The term "memory" includes the memory 260, the RAM 251 and the ROM 252 of the controller 250, or a storage card in the display device 200.

In some embodiments, the memory 260 is specifically used for storing the running programs that drive the controller 250 in the display device 200, various applications built into the display device 200 and downloaded by the user from external devices, and data used to configure the various GUIs on the screen 275, the various objects associated with the GUIs, and visual effect images of selectors for selecting GUI objects.

In some embodiments, the memory 260 is specifically used for storing drivers and related data of the tuning demodulator 210, the communicator 220, the detector 230, the external device interface 240, the video processor 270, the screen 275 and the audio processor 280, which can be external data received from the external device interface (e.g., audio and video data) or user data received from the user interface (e.g., key information, voice information and touch information).

In some embodiments, the memory 260 specifically stores software and/or programs for representing an operating system (OS), which may include, for example, a kernel, middleware, an application programming interface (API) and/or applications. Exemplarily, the kernel can control or manage system resources and functions implemented by other programs (such as the middleware, the API or the applications); meanwhile, the kernel can provide an interface to allow the middleware, the API or the applications to access the controller to realize control or management of system resources.

Figure 4:
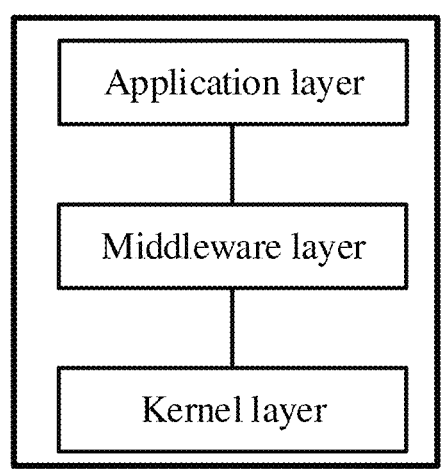
FIG. 4 is a block diagram of the architectural configuration of the operating system in a memory of a display device 200 according to some embodiments of the present disclosure.

FIG. 4 exemplarily illustrates an architectural configuration block diagram of the operating system in the memory of the display device 200. The operating system comprises an application layer, a middleware layer and a kernel layer from top to bottom.

Built-in applications and non-system level applications are part of the application layer. The application layer is responsible for direct interaction with users, and may include multiple applications such as setting application, electronic post application and media center application that are mainly developed based on Android system, with the development language of Java/C++. These applications may also be implemented as Web applications, which are executed based on WebKit engine and can be specifically developed and executed based on HTML5, Cascading Style Sheets (CSS) and JavaScript.

The middleware layer can provide some standard interfaces to support various operations in various environments and systems. For example, the middleware layer may be implemented as broadcasting related data, such as Multimedia and Hypermedia Information Encoding Expert Group (MHEG) related data, and external related data, such as Digital Living Network Alliance (DLNA) related data, and also as a middleware for providing a browser environment for various applications running in a display device.

The kernel layer provides kernel system services such as file management, memory management, process management, network management and system security authority management, and may be implemented as a kernel based on various operating systems, for example, a kernel based on the Linux operating system.

The kernel layer also provides communication between the system software and the hardware, and provides device drive services for various hardware, e.g., a panel driver for the screen, a camera driver for the camera, a key driver for the remote controller, a WiFi driver for the WIFI module, an audio driver for the audio output interface, and a power management driver for the power management (PM) module.

In FIG. 3, the user interface 265 receives various user interactions. Specifically, the user interface is used for sending a user input signal to the controller 250, or transmitting an output signal from the controller 250 to the user. Exemplarily, the remote controller 100A can send a signal input from a user such as a power switch signal, a channel selection signal and a volume control signal to the user interface 265, and then forward the signals to the controller 250 via the user interface 265; alternatively, the remote controller 100A can receive the output signals such as audio, video or data processed by the controller 250 and output from the user interface 265, and display the received output signals or output the received output signals in audio or vibration form.

In some embodiments, a user can input a user command on a graphic user interface (GUI) displayed on the screen 275, and the user interface 265 receives the user input command through the GUI. To be specific, the user interface 265 can receive a user input command for controlling the position of the selector in the GUI to select different objects or items. Here, the "user interface" is a medium interface for interaction and information exchange between an application and a user or between an operating systems and a user, which implements the conversion between the internal form of information and the form acceptable to the user. The common form of user interface is graphic user interface (GUI), which refers to a user interface displayed in a graphic form and associated with computer operations. GUI may comprise an icon, a window, a control and other interface elements displayed on the screen of the electronic device, where the control may include visual interface elements such as icons, menus, tabs, text boxes, dialog boxes, status bars, channel bars and Widget.

Alternatively, a user can input a command by inputting a specific sound or gesture, and the user interface 265 identifies the sound or gesture through the sensor to receive the user input command.

The video processor 270 is used for receiving external video signals, and performing video data processing such as decompression, decoding, scaling, noise reduction, frame rate conversion, resolution conversion and image synthesis according to the standard encoding and decoding protocol of the input signals to obtain video signals directly displayed or played on the screen 275.

Exemplarily, the video processor 270 includes a demultiplexing module, a video decoding module, an image synthesis module, a frame rate conversion module and a display formatting module.

Here, the demultiplexing module is used for demultiplexing the input audio and video data stream. For example, when the MPEG-2 streams (compression standard for motion pictures and speech based on digital storage media) are input, the demultiplexing module demultiplexes them into video signals and audio signals.

The video decoding module is used for processing the demultiplexed video signal, including decoding and scaling processing.

The image synthesis module (e.g. an image synthesizer) is used for superimposing and mixing a GUI signal generated by a graphic generator based on the user input or itself with the scaled video image to generate an image signal ready for display.

The frame rate conversion module is used for converting the frame rate of the input video, e.g. from 60 Hz to 120 Hz or 240 Hz, usually in the form of interpolation.

The display formatting module is used for changing the signal output from the frame rate conversion module into a signal conforming to the display format of the screen, for example, converting the format of the signal output from the frame rate conversion module to output an RGB data signal.

The screen 275 is used for receiving the image signal from the video processor 270 to display the video content, images, and menu control application interfaces. The displayed video content can be the video content in the broadcast signal received by the tuning demodulator 210, or the video content input by the communicator 220 or the external device interface 240. The screen 275 also displays a user control application interface UI generated in the display device 200 and used for controlling the display device 200.

In addition, the screen 275 may include a display component for presenting images and a driving component for driving image display. If the screen 275 is a projection display, it may also include a projection device and a projection display.

The controller can send a control signal to enable the screen 275 rotate through the rotating component 276.

The audio processor 280 is used for receiving external audio signals, decompressing and decoding the audio signals according to the standard encoding and decoding protocol of the input signal, and performing audio data processing such as noise reduction, digital-to-analog conversion and amplification processing, to obtain an audio signal that can be played in a speaker 286.

Exemplarily, the audio processor 280 can support various audio formats, e.g., MPEG-2, MPEG-4, advanced audio coding (AAC) and high efficiency AAC (HE-AAC).

The audio output interface 285 is used for receiving the audio signal output from the audio processor 280 under the control of the controller 250, and may include a speaker 286, or an external audio output terminal 287 that is output to a generator of an external device, such as a headphone output terminal.

In some other exemplary embodiments, the video processor 270 may include one or more chips, and the audio processor 280 may also include one or more chips.

As well, in some other exemplary embodiments, the video processor 270 and the audio processor 280 may be separate chips, or may be integrated with the controller 250 into one or more chips.

Under the control of the controller 250, the power supply 290 uses the power input from the external power supply to provide power support for the display device 200. The power supply 290 may be a built-in power circuit inside the display device 200 or a power supply outside the display device 200.

As the rotary TV is new, many applications for the display device have not been adapted and can only support landscape orientation, when the user sends a rotation command to the TV, the state of the screen is switched, and if the application at this time does not support the rotated display orientation, it will affect user experience.

Figure 5:
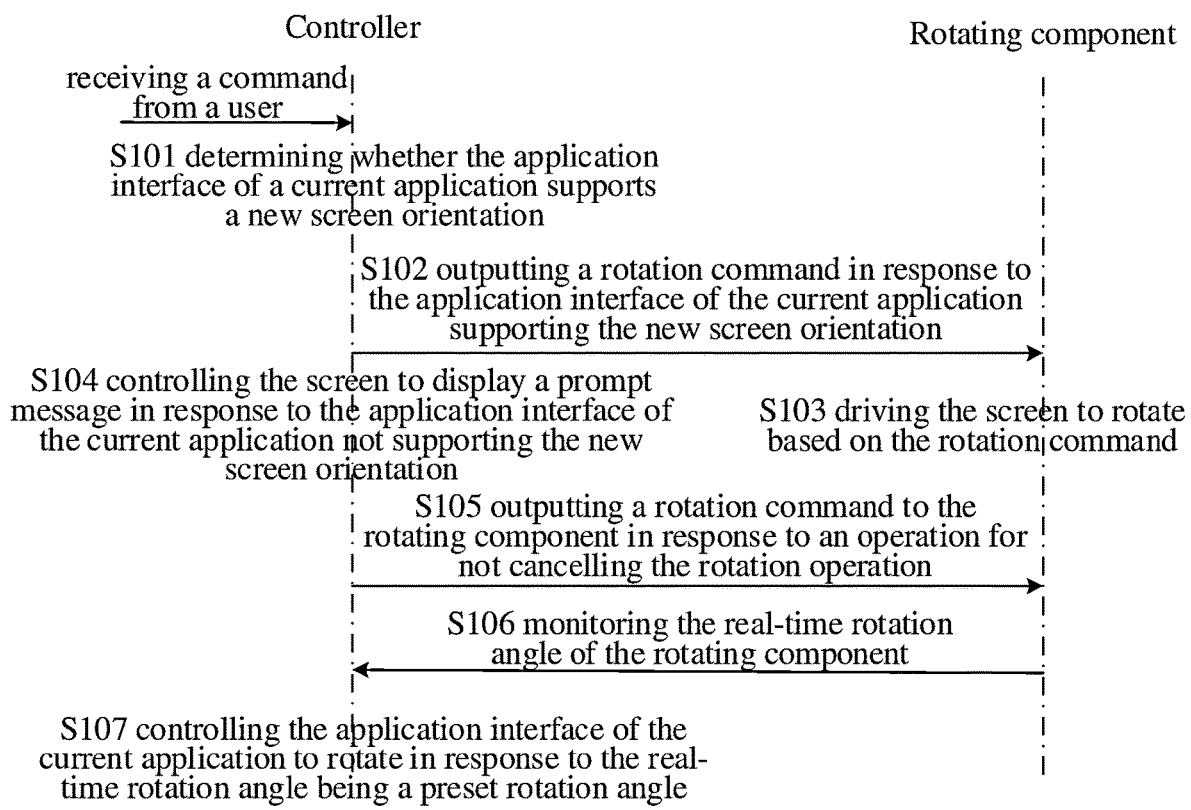
FIG. 5 illustrates a first operation flow chart of a display device according to some embodiments.

In view of the above issues, an embodiment of this application provides a display device, and the specific process can refer to FIG. 5. The structure of the display device and the functions of each component can refer to the above embodiments. On the basis of the above embodiments, the controller is configured to execute step S101: determining whether the application interface of a current application supports a new screen orientation in response to a command from a user. Here, the command triggers the screen to rotate, and the new screen orientation is a screen orientation after rotation.

In this embodiment, the command may be a user voice, for example, the user speaks "Rotate X by XX degrees", "Rotate X to a portrait mode", "Rotate to a portrait mode" and so on. The command may also be operation information. Specifically, the operation information can be output from the user to the controller 250 via the remote controller. For example, when the operation information corresponding to the shortcut key of the remote controller is "Rotate X by XX degrees", the user can touch the volume down key to trigger the remote controller to output the operation information.

In the embodiments of this disclosure, in response to a command received from a user, the controller 250 does not immediately control the screen to rotate, but first determines whether the application interface of the current application supports a new screen orientation (screen orientation after rotation), and adopts different processing methods according to different determination results.

The implementation method of the controller 250 for determining whether the application interface of the current application supports a new screen orientation is as follows.

Figure 6:
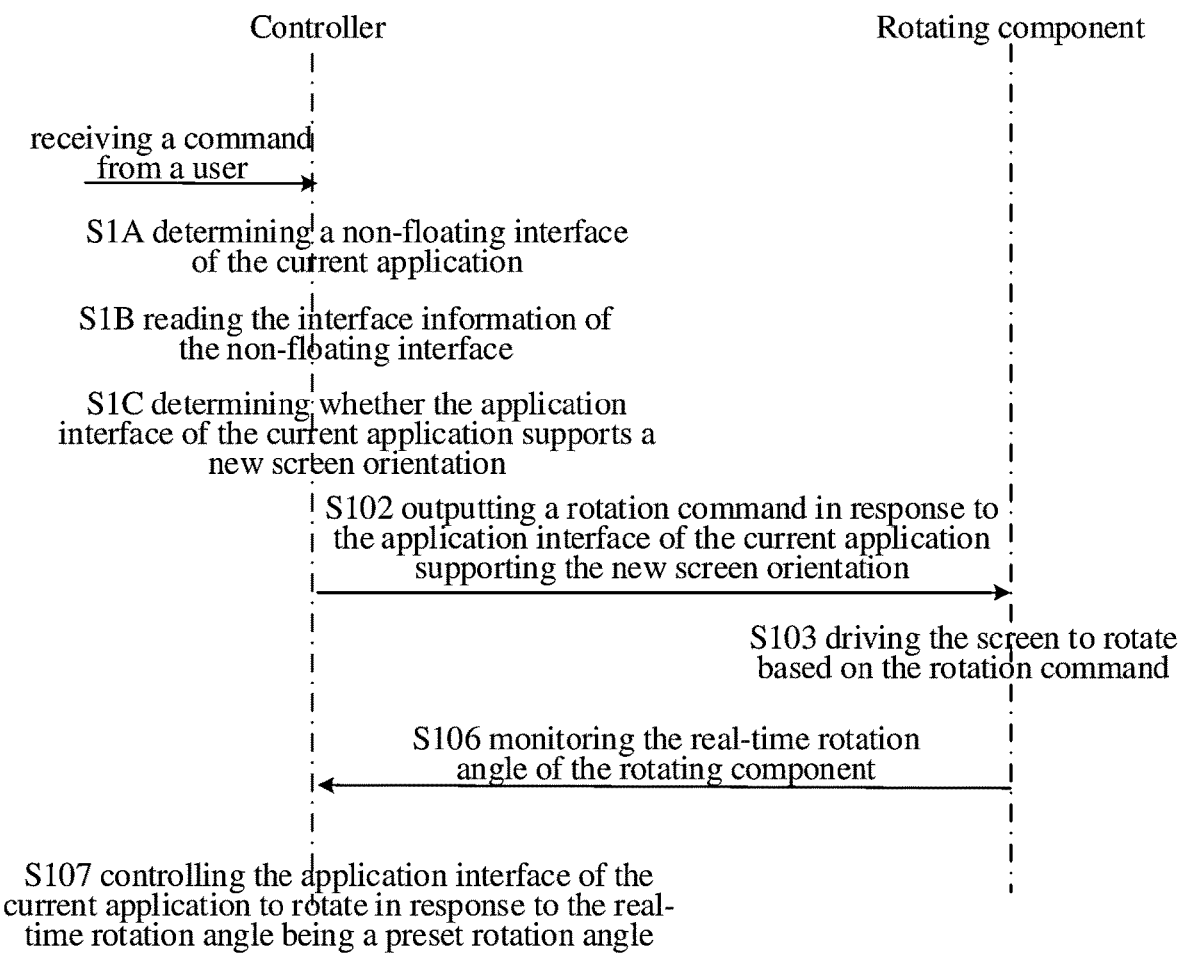
FIG. 6 illustrates a second operation flow chart of a display device according to some embodiments.

FIG. 6 shows a flow chart of the display device according to an embodiment of this disclosure. Referring to FIG. 6, the controller 250 is further configured to perform following steps.

S1A, determining a non-floating interface of the current application.

In the application, the application interface is divided into a floating interface and a non-floating interface.

The floating interface refers to a temporary application interface that launches an application on the current page. These temporary application interfaces can perform prompt-related or context-related tasks, and they are less interruptive and maintain a more coherent user experience. The floating interface may also be referred to as a "floating layer", a "pop-up layer", a "pop-up box" and so on.

The non-floating interface is an application interface in which the application displays its characteristics and function components for outside, and usually occupies the whole screen interface during display. Therefore, the display effect of the non-floating interface has a direct impact on the user experience. In the embodiments of this disclosure, the non-floating interface of the current application is first determined before controlling the screen to rotate.

Figure 7:
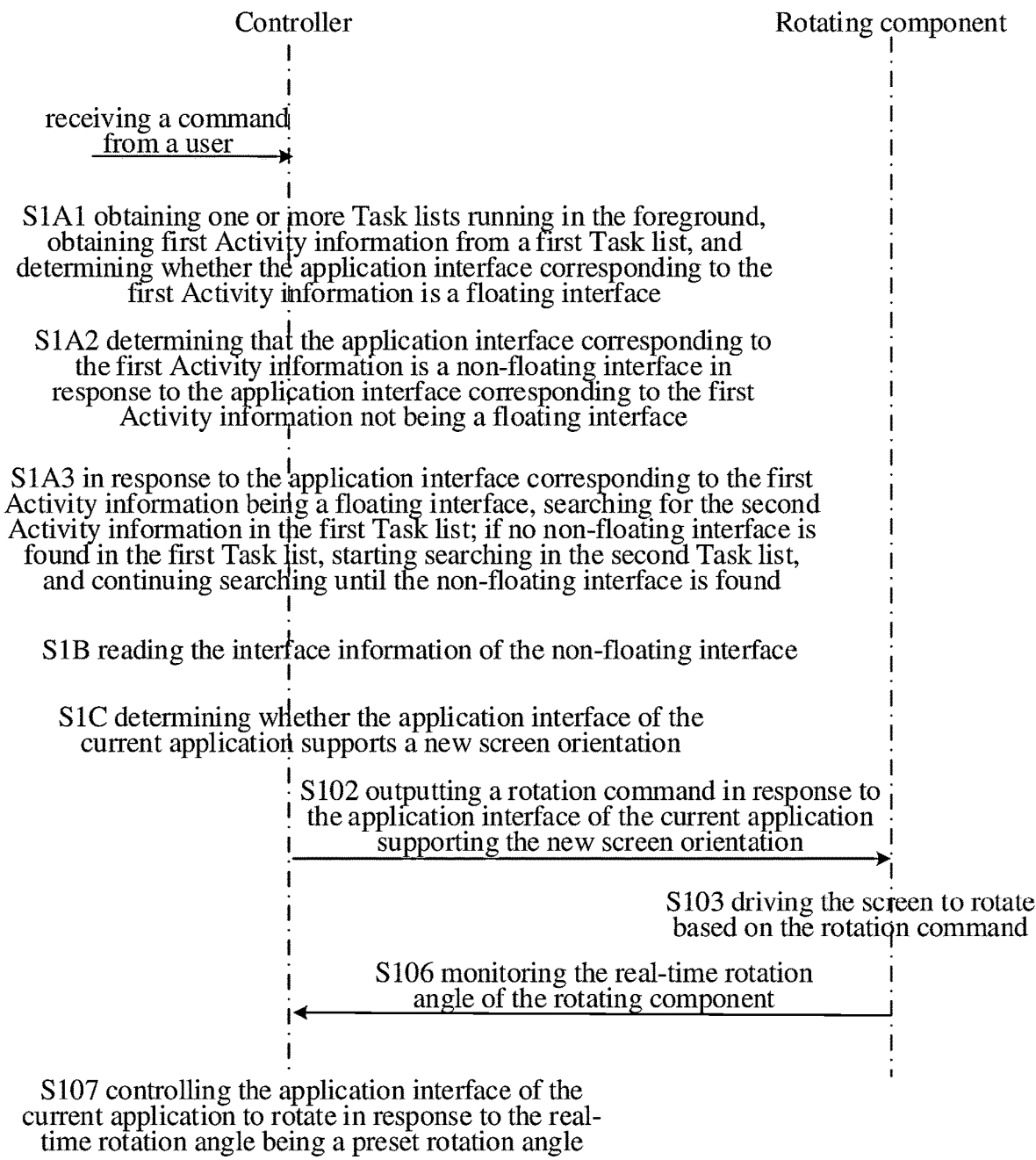
FIG. 7 illustrates a third operation flow chart of a display device according to some embodiments.

The non-floating interface can be determined by the following methods. Specifically, referring to FIG. 7 which shows a flow chart of the display device according to an embodiment of this disclosure, the controller 250 is further configured to perform the following steps.

S1A1, obtaining one or more Task lists running in the foreground, obtaining first Activity information from a first Task list, and determining whether the application interface corresponding to the first Activity information is a floating interface.

To obtain Task lists running in the foreground, a Tasklist command can be entered in the port of the system, and then all the local processes will be displayed in the one or more Task lists. The Tasklist command can not only view the system process, but also view the Activity information of each process. Whether the process application interface is a non-floating interface can be determined by identifying the Activity information of the process application interface.

Various implementation methods can be used to determine whether the process application interface is a non-floating interface through Activity information.

For example, whether the application interface corresponding to the Activity information is a non-floating interface can be determined by determining whether the Activity information is stored in the floating interface list.

Figure 8:
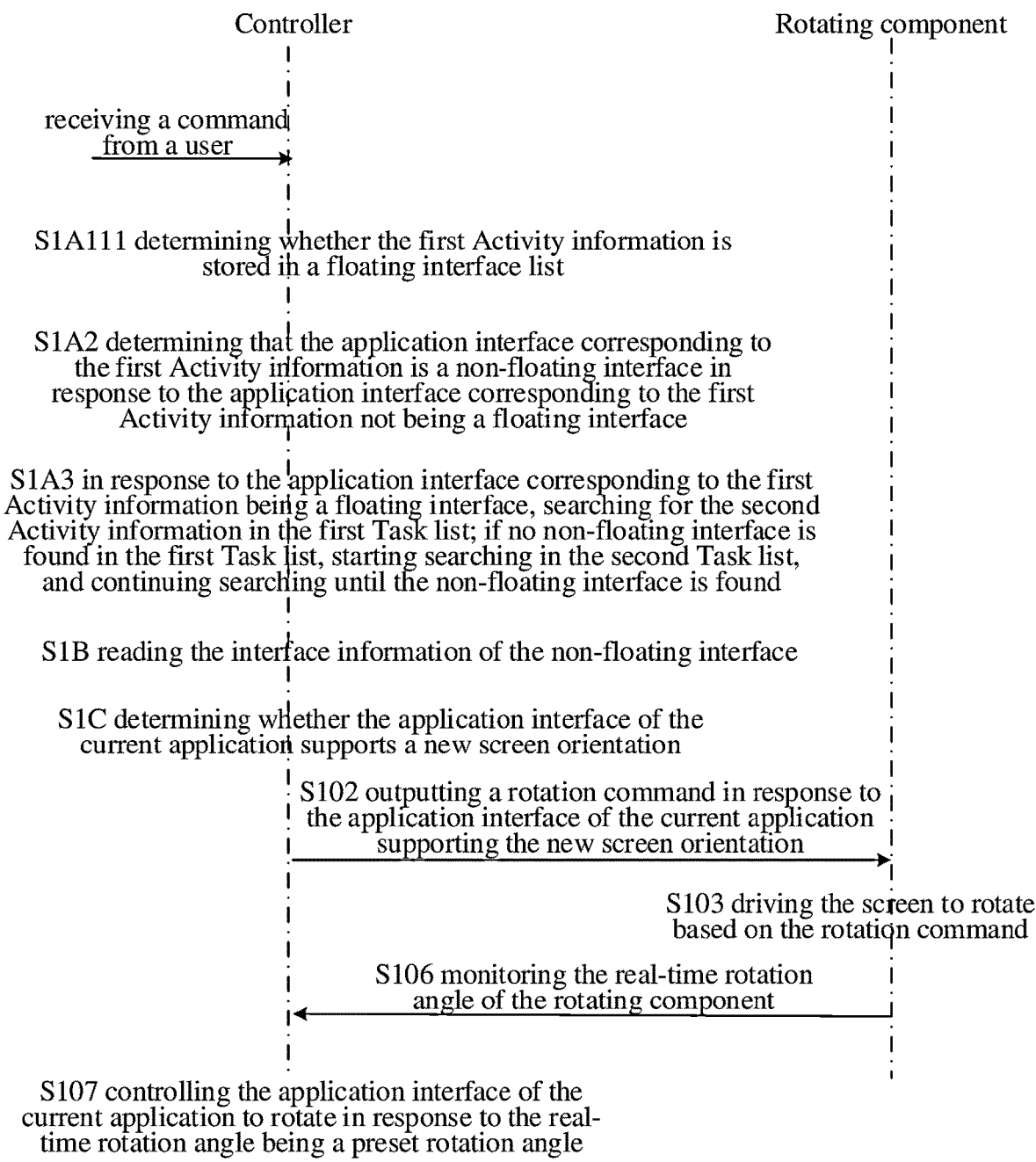
FIG. 8 illustrates a fourth operation flow chart of a display device according to some embodiments of the present disclosure.

Referring to FIG. 8 which is a flow chart of a display device according to an embodiment, the controller 250 is further configured to perform the following steps.

S1A111, determining whether the first Activity information is stored in a floating interface list, where the floating interface list is used to record the Activity information of the floating interfaces in the display device; if the first Activity information is stored in the list, it is determined that the application interface corresponding to the first Activity information is a floating interface; and if the first Activity information is not stored in the list, it is determined that the application interface corresponding to the first Activity information is a non-floating interface.

In the embodiments of this disclosure, the Activity information of the floating interface is stored in a floating interface list in advance, and the floating interface list is stored in a memory. The controller 250 can call the floating interface list in the working process if needed.

It is noted that an application corresponds to multiple process application interfaces. For an application, the number of non-floating interfaces is much larger than that of floating interfaces. In view of this, in the embodiment of this disclosure, a floating interface list is generated for the application according to the Activity information of the floating interfaces of the application. Less data are recorded in the floating interface list which can help increase the available memory capacity of the display device and further improve the data processing efficiency of the display device; moreover, in the process of determining whether the first Activity information is stored in the floating interface list, the controller 250 needs to traverse the floating interface list and the floating interface list has less data recorded in it, thus the traversal efficiency can be improved correspondingly.

For another example, whether the application interface corresponding to the Activity information is a non-floating interface can be determined through the application interface theme of the Activity information.

Figure 9:
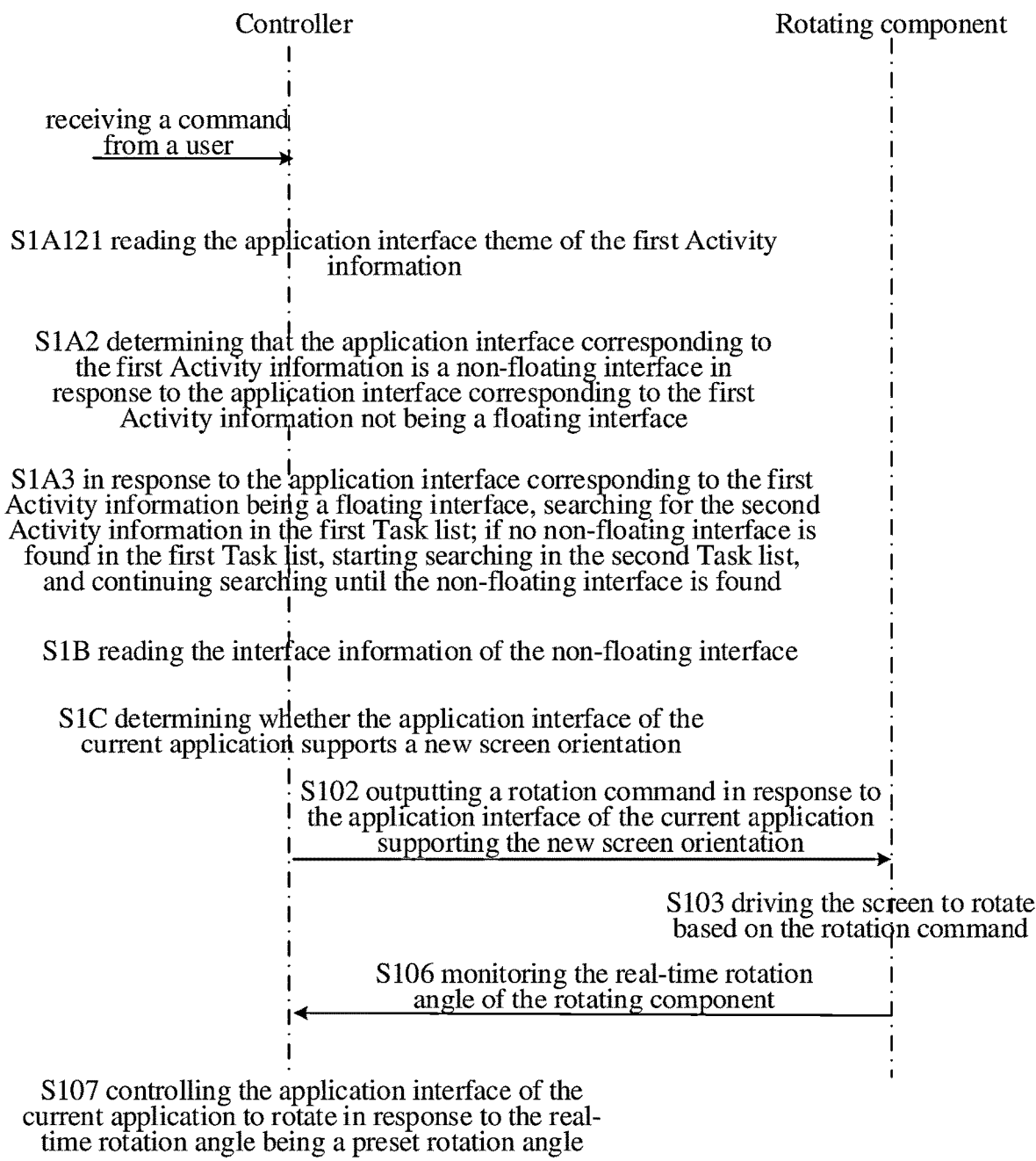
FIG. 9 illustrates a fifth operation flow chart of a display device according to some embodiments.

Referring to FIG. 9, which is a flow chart of a display device according to an embodiment, the controller 250 is further configured to perform the following steps.

S1A121, reading the application interface theme of the first Activity information.

When the application interface theme is a transparent theme, the application interface corresponding to the first Activity information is determined to be a floating interface.

When the application interface theme is not a transparent scheme, the application interface corresponding to the first Activity information is a non-floating interface.

Each of the Activity information has the application interface theme recoded in it, and the application interface theme contains the settings for the application interface, which may include settings such as application interface style, application interface title, application interface transparency, etc. Here, the transparency may include layout transparency, Activity transparency, color transparency and background transparency. According to the transparency setting, the controller 250 can determine whether the application interface corresponding to the Activity information is a non-floating interface.

S1A2, determining that the application interface corresponding to the first Activity information is a non-floating interface in response to the application interface corresponding to the first Activity information not being a floating interface.

S1A3, in response to the application interface corresponding to the first Activity information being a floating interface, searching for the second Activity information in the first Task list; if no non-floating interface is found in the first Task list, starting searching in the second Task list, and continuing searching until the non-floating interface is found.

It is noted that the application interfaces corresponding to an application may include a floating interface and a non-floating interface, or may only include a non-floating interface. Using the method for determining the non-floating interface in the above embodiments, the non-floating interface determined by the controller 250 for the first time is the display interface of the current application.

In an embodiment, the Task lists running in the foreground include Task list 1, Task list 2 and Task list 3. The Activity information recorded in Task list 1 can be found in Table 1 below.

TABLE 1

| S/N | Activity information | Application interface |
|---|---|---|
| 1 | Activity information 1 | Application interface 1 |
| 2 | Activity information 2 | Application interface 2 |
| 3 | Activity information 3 | Application interface 3 |
| 4 | Activity information 4 | Application interface 4 |
| ... | ... | ... |
| n | Activity information n | Application interface n |

The controller 250 first reads the Activity information 1 in the Task list 1, determines that the Activity information 1 is stored in the floating interface list, and then determines that the application interface 1 is a floating interface. The controller 250 continues to read the Activity information 2, determines that the Activity information 2 is stored in the floating interface list, and then determines that the application interface 2 is a floating interface, and so on, until the controller 250 continues to read the Activity information n, determines that the Activity information n is stored in the floating interface list, and then determines that the application interface n is a floating interface. The controller 250 continues to read the related information in the Task list 2 until the non-floating interface is found.

S1B, reading the interface information of the non-floating interface.

The interface information described in this disclosure at least includes a page name and an application name, where the interface information has a one-to-one correspondence with the application interface.

For example, the application being pulled up by the display device and the interface information corresponding to the application are shown in Table 2 below.

TABLE 2

| S/N | Applications | Application interface | Interface information |
|---|---|---|---|
| 1 | Application 1 | Application interface 1 | Application 1, Application interface 1 |
|  |  | Application interface 2 | Application 1, Application interface 2 |
|  |  | Application interface 3 | Application 1, Application interface 3 |
|  |  | Application interface 4 | Application 1, Application interface 4 |
| 2 | Application 2 | Application interface 1 | Application 2, Application interface 1 |
|  |  | Application interface 2 | Application 2, Application interface 2 |
|  |  | Application interface 3 | Application 2, Application interface 3 |
|  |  | Application interface 4 | Application 2, Application interface 4 |
|  |  | Application interface 5 | Application 2, Application interface 5 |
| 3 | Application 3 | Application interface 1 | Application 3, Application interface 1 |
|  |  | Application interface 2 | Application3, Application interface 2 |
|  |  | Application interface 3 | Application 3, Application interface 3 |
| ... | ... | ... | ... |
| n | Activity information n | Application interface 1 | Application n, Application interface 1 |
|  |  | Application interface 2 | Application n, Application interface 2 |

TABLE 2-continued

| S/N | Applications | Application interface | Interface information |
|---|---|---|---|
|  |  | Application interface 3 | Application n, Application interface 3 |
|  |  | Application interface 4 | Application n, Application interface 4 |

As can be seen from above table, the interface information in the embodiments of this disclosure has a one-to-one correspondence with the application interface.

S1C, determining whether the application interface of the current application supports a new screen orientation.

Various implementation methods can be used to determine whether the application interface of the current application supports a new screen orientation based on the interface information.

For example, the configuration information corresponding to the interface information can be identified and used for determining whether the application interface of the current application supports a new screen orientation.

Figure 10:
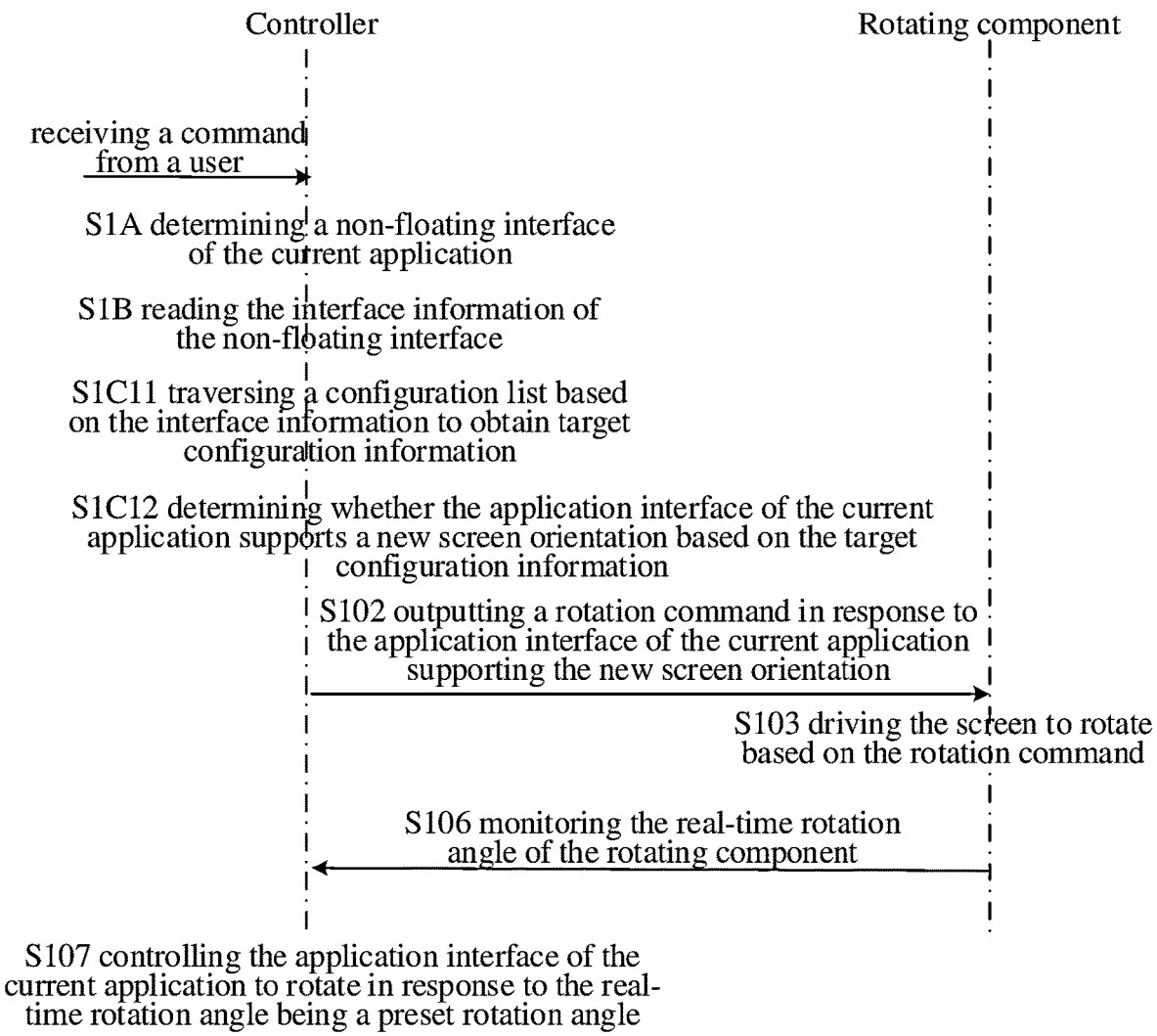
FIG. 10 illustrates a sixth operation flow chart of a display device according to some embodiments.

Referring to FIG. 10, which shows a flow chart of a display device according to an embodiment, the processor is further configured to perform step S1C11: traversing a configuration list based on the interface information to obtain target configuration information, where the target configuration information is the configuration information of said interface information, and said interface information is the interface information corresponding to the current application.

The configuration list records the correspondence between the interface information and the configuration information. A configuration list in an embodiment is shown in Table 3 below.

TABLE 3

| S/N | Interface information | Configuration information |
|---|---|---|
| 1 | Application 1, Application interface 1 | Configuration information 11 |
| 2 | Application 1, Application interface 2 | Configuration information 12 |
| 3 | Application 1, Application interface 3 | Configuration information 13 |
| 4 | Application 1, Application interface 4 | Configuration information 14 |
| 5 | Application 2, Application interface 1 | Configuration information 21 |
| 6 | Application 2, Application interface 2 | Configuration information 22 |
| 7 | Application 2, Application interface 3 | Configuration information 23 |
| 8 | Application 2, Application interface 4 | Configuration information 24 |
| 9 | Application 2, Application interface 5 | Configuration information 25 |
| 10 | Application 3, Application interface 1 | Configuration information 31 |
| 11 | Application 3, Application interface 2 | Configuration information 32 |
| 12 | Application 3, Application interface 3 | Configuration information 33 |
| ... |  |  |
| n − 3 | Application n, Application interface 1 | Configuration information n1 |
| n − 2 | Application n, Application interface 2 | Configuration information n2 |
| n − 1 | Application n, Application interface 3 | Configuration information n3 |
| n | Application n, Application interface 4 | Configuration information n4 |

Taking Android system as an example, for configuration information, each Activity type application interface configures the value of each attribute (i.e. configuration information) in the file "AndroidManifests.xml", where the configuration attribute "android:screen orientation" indicates the screen orientation supported by the application interface.

Usually, the default value of configuration attribute for "screen orientation" is unspecified, which means that the screen orientation is selected by the system. This orientation is determined by the device, for example, the display device is generally placed horizontally and is configured to display in landscape orientation when the configuration attribute of "screen orientation" is unspecified, and the mobile phone is in portrait orientation by default.

The configuration attribute of "screen orientation" can be specified as follows.

Landscape, indicating that the screen is forced to be in landscape orientation, and usually matches a landscape display device.

Portrait, indicating that the screen is forced to be in portrait orientation, and usually matches a portrait phone.

Behind, indicating the same orientation as the previous application interface, and capable of matching landscape and portrait devices simultaneously.

Sensor, indicating rotation to be close to landscape or portrait for display depending on the sensor orientation, and capable of matching both landscape and portrait devices.

Sensor Landscape, indicating a landscape rotation for 180 degrees only, and usually matches a landscape display device.

Sensor Portrait, indicating a portrait rotation for 180 degrees only, and usually matches a portrait phone.

No sensor, indicating that the application interface does not rotate with the screen when the screen is rotated, and usually matches a landscape display device.

User, indicating the orientation currently set by a user, and capable of matching both landscape and portrait devices.

Landscape and portrait may apply to mobile phones, tablet computers and other products, and the above values are used well. However, for display devices whose screens have previously been in landscape, most applications do not declare this attribute, that is to say they only support landscape, i.e. the above mentioned LandScape. Some applications set the configuration attribute of "screen orientation" so that the application is able to be adapted with portrait or rotation.

S1C12, determining whether the application interface of the current application supports a new screen orientation based on the target configuration information.

In the embodiments of this disclosure, the controller 250 determines whether the application interface of the current application supports the new screen orientation by reading the configuration attribute of "screen orientation" in the configuration information.

For example, the "screen orientation" of the current application is configured as Sensor. When the new screen orientation is a portrait orientation, the application interface of the current application supports a new screen orientation.

For another example, the "screen orientation" of the current application is configured as Landscape. When the new screen orientation is a portrait orientation, the application interface of the current application does not support the new screen orientation.

In some embodiments, the rotation identification value in the interface information can be identified and used to determine whether the application interface of the current application supports a new screen orientation.

Figure 11:
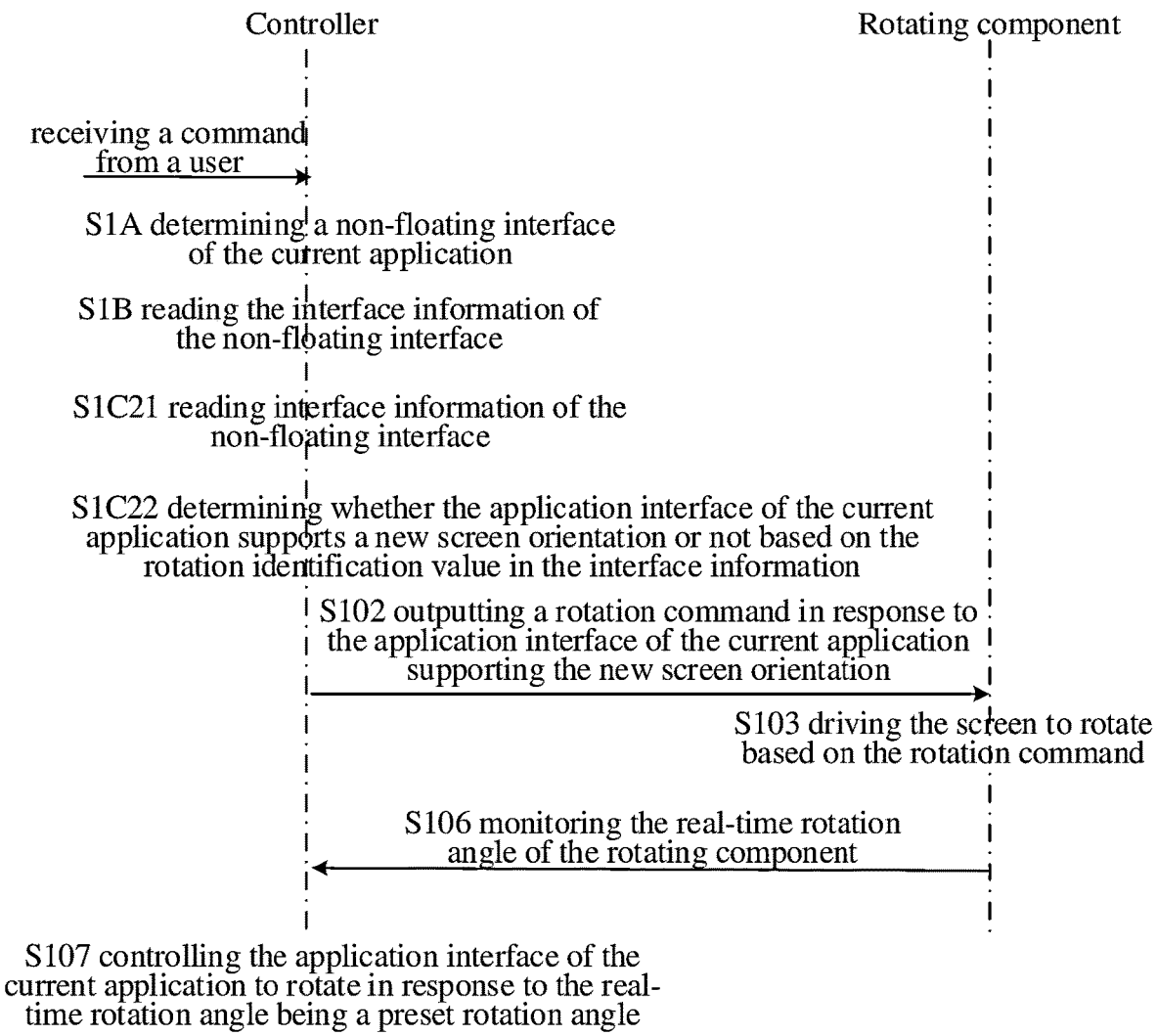
FIG. 11 illustrates a seventh operation flow chart of a display device according to some embodiments of the present disclosure.

Referring to FIG. 11, which shows a flow chart of the display device according to an embodiment, the controller 250 is further configured to perform the followings steps.

S1C21, reading interface information of the non-floating interface.

How to read the interface information of the non-floating interface can refer to the above embodiments, and will omit here.

S1C22, determining whether the application interface of the current application supports a new screen orientation or not based on the rotation identification value in the interface information.

In these embodiments, a rotation identification value is added to the interface information. By identifying the rotation identification value, it can be determined whether the application interface of the current application corresponding to the interface information supports the new screen orientation.

For example, an identification value "com.android.app, H" is added to the interface information. Here, "H" indicates that only landscape is supported, "V" indicates that only portrait is supported, and "HV" indicates that landscape and portrait are simultaneously supported.

It may declare an orientation for each application interface, the name of the specific application interface is specified. In this case, the format of the identification value is: "application name/application interface name, supported orientations", e.g. "com.android.app/.Activity1, H", or "com.android.app/.Activity2, V".

S102, outputting a rotation command in response to the application interface of the current application supporting the new screen orientation.

S103, driving the screen to rotate based on the rotation command.

S104, controlling the screen to display a prompt message in response to the application interface of the current application not supporting the new screen orientation. The prompt message indicates that the application interface of the current application does not support the new screen orientation.

Further, the prompt message also prompts the user to determine whether to cancel the rotation operation.

The controller 250 is further configured to perform step S105: outputting a rotation command to the rotating component in response to an operation for not cancelling the rotation operation.

Due to large size of a rotating TV, the rotation speed is slower and it usually takes 8-10 seconds to finish rotation, but an application interface can rotate instantaneously. Controlling the rotation of the application interface at an appropriate time point can improve the user experience in some extent.

In some embodiments, the controller is further configured to perform step S106: monitoring the real-time rotation angle of the rotating component.

It is noted that the monitoring (collection) process can be completed in the controller. In some embodiments, the collection process can also be completed in the monitoring processor arranged in the controller. The above monitoring process can also be completed in the monitoring component 277 arranged independently, which can be a gyroscope, a geomagnetic sensor, an acceleration sensor, or various sensors, etc.

In some embodiments, the monitoring component may be an acceleration sensor that collects a real-time rotation angle every 0.2 s.

In these embodiments, the acceleration sensor records the angle increment of component rotation, and each angle increment corresponds to a real-time rotation angle.

For example, in the initial state, the real-time rotation angle of the screen in the landscape state is "0 degree".

The angle increment sent from the acceleration sensor is "2 degrees" at 0.2 s, and the corresponding real-time rotation angle is "2 degrees".

The angle increment sent from the acceleration sensor is "2 degrees" at 0.4 s, and the corresponding real-time rotation angle is "4 degrees".

The acceleration sensor outputs the real-time rotation angle to the controller 250.

In response to the real-time rotation angle being a preset rotation angle, the controller 250 is further configured to perform step S107: controlling the application interface of the current application to rotate.

The preset angle can be set according to the user requirements, and may be 45 degrees in an embodiment. When the angle received by the controller 250 is 45 degrees, the controller 250 controls the application interface to rotate.

It is noted that the above calculation process can be completed in the controller. In an embodiment, the above calculation process may also be in the application processor arranged in the controller.

The embodiment of this disclosure provides an interface switching method of a display device and a display device. The display device includes a screen; a controller 250 configured to determine whether the application interface of a current application supports a new screen orientation in response to a command received from a user, where the command triggers the screen to rotate, and the new screen orientation is the screen orientation after rotation; if the application interface of the current application supports a new screen orientation, outputting a rotation command; if the application interface of the current application does not support a new screen orientation, controlling the screen to display a prompt message, where the prompt message indicates that the application interface of the current application does not support the new screen orientation; and a rotating component, configured to drive the screen to rotate based on the rotating command. According to this application, the controller 250 first determines whether the application interface of the current application supports a new screen orientation; if so, outputs a rotation command so that the rotating component can drive the screen to rotate based on the rotation command, and if not, controls the screen to display the prompt message, so that the user can determine whether to continue to control the screen to rotate according to actual requirements via the prompt message. It can be seen that the display device in the embodiments of this disclosure provides more choices for the user, and the user can choose whether to continue to control the screen to rotate according to the actual needs, thereby improving the user experience.

In a specific implementation, this application further provides a computer storage medium, where the computer storage medium can store programs which, when executed, can include part or all of the steps in the embodiments of this disclosure. The storage medium may be diskette, optical disk, read-only memory (ROM) or random access memory (RAM).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display device, comprising:
   a screen configured to rotate 360-degrees;
   a rotating component, in connection with the screen and configured to drive the screen to rotate for a preset angle; and
   a controller, in connection with the screen and rotating component and configured to:
   while an application interface of a current application is running on the screen in a first screen orientation, receive a first command for rotating the screen by a first degree angle from a user;
   in response to the first command for rotating the screen by the first degree angle, determine whether a display mode of the application interface of the current application matches a second screen orientation before driving the rotating component to complete rotation indicated in the first command, the second screen orientation is a screen orientation after rotation indicated in the first command, the display mode of the application interface is landscape mode or portrait mode, the second screen orientation comprises landscape mode or portrait mode;
   in response to determining that the application interface matches the second screen orientation, control the rotating component to rotate the first degree angle; and
   in response to determining that the application interface does not match the second screen orientation, control the screen to display a prompt message, wherein the prompt message indicates that the application interface does not support the second screen orientation and prompts the user to determine whether to cancel rotation;
   in response to a second command for not cancelling the rotation, output the first command to the rotating component;
   monitor rotation data of the screen from the rotating component; and
   in response to the rotation data of the screen being the first degree angle, cause the display mode of the application interface to switch.

2. The display device of claim 1, wherein the controller is further configured to:
   determine a non-floating interface of the current application;
   read interface information of the non-floating interface;
   traverse a configuration list based on the interface information to obtain target configuration information, wherein the target configuration information is configuration information corresponding to the interface information of the non-floating interface; and
   determine whether the application interface of the current application supports the second orientation based on the target configuration information.

3. The display device of claim 1, wherein the controller is further configured to:
   determine a non-floating interface of the current application;
   read interface information of the non-floating interface;
   determine whether the application of the current application supports the second orientation based on a rotation identification value in the interface information.

4. The display device of claim 2, wherein the controller is further configured to:
   obtain one or more Task lists running in a foreground;
   obtain first Activity information from a first Task list in the one or more Task lists, and determine whether an application interface corresponding to the first Activity information is a floating interface;
   in response to the application interface corresponding to the first Activity information being not the floating interface, determine that the application interface corresponding to the first Activity information is the non-floating interface; and in response to the application interface corresponding to the first Activity information being the floating interface, search for a second Activity information from the first Task list;

when all Activity information found in the first list corresponds to the floating interface, search for a second Task list from the one or more Task lists, and continuing searching until Activity information found corresponds an application interface that is not the floating interface.

5. The display device of claim 4, wherein the controller is further configured to:

determine whether the first Activity information is stored in a floating interface list, wherein the floating interface list records Activity information of floating interfaces in the display device;

in response to the first Activity information being stored in the floating interface list, determine that the application interface corresponding to the first Activity information is a floating interface; and in response to the first Activity information being not stored in the floating interface list, determine that the application interface corresponding to the first Activity information is the non-floating interface.

6. The display device of claim 4, wherein the controller is further configured to:

read an application interface theme of the first Activity information; and determine whether the application interface theme is a transparent scheme;

in response to the application interface theme being the transparent scheme, determine the application interface corresponding to the first Activity information is a floating interface;

in response to the application interface theme being not the transparent scheme, determine the application interface corresponding to the first Activity information is the non-floating interface.

7. The display device of claim 1, wherein the controller is further configured to:

monitor a rotation angle of the rotating component in real time; and in response to the monitored rotation angle being a predefined rotation angle, control the application interface of the current application to rotate.

8. An interface switch method for a screen rotatable display device, comprising:

receiving a first command for rotating a screen of the screen rotatable display device by a first degree angle from a user, while an application interface of a current application is running on the screen in a first screen orientation;

in response to the first command for rotating the screen by the first degree angle, determining whether a display mode of the application interface of the current application matches a second screen orientation before driving the rotating component to complete rotation indicated in the first command, the second screen orientation is a screen orientation after rotation indicated in the first command, the display mode of the application interface is landscape mode or portrait mode, the second screen orientation comprises landscape mode or portrait mode;

in response to determining that the application interface matches the second screen orientation, controlling a rotating component to rotate the first degree angle; and in response to determining that the application interface does not match the second screen orientation, controlling the screen to display a prompt message, wherein the prompt message indicates that the application interface does not support the second screen orientation and prompts the user to determine whether to cancel rotation;

in response to a second command for not cancelling the rotation, output the first command to the rotating component;

monitor rotation data of the screen from the rotating component; and in response to the rotation data of the screen being the first degree angle, cause the display mode of the application interface to switch.

9. The method of claim 8, wherein the determining whether the application interface of the current application supports the second screen orientation comprises:

determining a non-floating interface of the current application;

reading interface information of the non-floating interface;

traversing a configuration list based on the interface information to obtain target configuration information, wherein the target configuration information is configuration information corresponding to the interface information of the non-floating interface; and determining whether the application interface of the current application supports the second orientation based on the target configuration information.

10. The method of claim 8, wherein the determining whether the application interface of the current application supports the second screen orientation comprises:

determining a non-floating interface of the current application;

reading interface information of the non-floating interface;

determining whether the application of the current application supports the second orientation based on a rotation identification value in the interface information.

11. The method of claim 9, wherein the determining the non-floating interface of the current application comprises:

obtaining one or more Task lists running in a foreground;

obtaining first Activity information from a first Task list in the one or more Task lists, and determining whether an application interface corresponding to the first Activity information is a floating interface;

in response to the application interface corresponding to the first Activity information being not the floating interface, determining that the application interface corresponding to the first Activity information is the non-floating interface; and in response to the application interface corresponding to the first Activity information being the floating interface, searching for a second Activity information from the first Task list;

when all Activity information found in the first list corresponds to the floating interface, searching for a second Task list from the one or more Task lists, and continuing searching until Activity information found corresponds an application interface that is not the floating interface.

12. The method of claim 11, wherein the determining the non-floating interface of the current application comprises:

determining whether the first Activity information is stored in a floating interface list, wherein the floating interface list records Activity information of floating interfaces in the display device;

in response to the first Activity information being stored in the floating interface list, determining that the application interface corresponding to the first Activity information is a floating interface; and in response to the first Activity information being not stored in the floating interface list, determining that the application interface corresponding to the first Activity information is the non-floating interface.

13. The method of claim 11, wherein the determining the non-floating interface of the current application comprises:

reading an application interface theme of the first Activity information; and determining whether the application interface theme is a transparent scheme;

in response to the application interface theme being the transparent scheme, determining the application interface corresponding to the first Activity information is a floating interface;

in response to the application interface theme being not the transparent scheme, determining the application interface corresponding to the first Activity information is the non-floating interface.

14. The method of claim 8, further comprising:

monitoring a rotation angle of the rotating component in real time; and in response to the monitored rotation angle being a predefined rotation angle, controlling the application interface of the current application to rotate.

* * * * *